(12) United States Patent
Koyama (10) Patent No.: US 12,272,081 B2
(45) Date of Patent: Apr. 8, 2025

(54) INSPECTION APPARATUS, IMAGE FORMING SYSTEM, MISALIGNMENT MEASUREMENT METHOD AND STORAGE MEDIUM

(71) Applicant: Takahiro Koyama, Kanagawa (JP)

(72) Inventor: Takahiro Koyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 433 days.

(21) Appl. No.: 17/719,685

(22) Filed: Apr. 13, 2022

(65) Prior Publication Data

US 2022/0335629 A1 Oct. 20, 2022

(30) Foreign Application Priority Data

Apr. 15, 2021 (JP) .................. 2021-069030

(51) Int. Cl.
*G06T 7/33* (2017.01)
*G06T 7/00* (2017.01)
*G06V 10/44* (2022.01)
*G06V 10/74* (2022.01)
*G06V 10/77* (2022.01)

(52) U.S. Cl.
CPC ............... *G06T 7/33* (2017.01); *G06T 7/001* (2013.01); *G06V 10/44* (2022.01); *G06V 10/761* (2022.01); *G06V 10/7715* (2022.01); *G06V 2201/07* (2022.01)

(58) Field of Classification Search
CPC .... H04N 1/00376; H04N 1/0066; G06T 7/33; G06T 7/001; G06V 10/7715; G06V 10/761; G06V 10/44; G06V 2201/07
See application file for complete search history.

(56) References Cited

U.S. PATENT DOCUMENTS

| | | | |
|---|---|---|---|
| 2016/0219168 A1* | 7/2016 | Shimada | ............ H04N 1/00363 |
| 2019/0377295 A1* | 12/2019 | Igarashi | ............ G03G 15/5016 |
| 2021/0166363 A1 | 6/2021 | Koyama | |
| 2022/0028047 A1 | 1/2022 | Mashiko et al. | |

FOREIGN PATENT DOCUMENTS

| | | |
|---|---|---|
| JP | 7-170371 | 7/1995 |
| JP | 2017-167306 | 9/2017 |
| JP | 2019-195211 | 11/2019 |

* cited by examiner

*Primary Examiner* — Molly Wilburn
(74) *Attorney, Agent, or Firm* — IPUSA, PLLC (57) ABSTRACT

An inspection apparatus includes processing circuitry. The processing circuitry acquires read image data obtained by reading an image printed on both sides of a conveyance medium. The processing circuitry searches for marks printed on both sides of the conveyance medium in the read image data. The processing circuitry outputs information indicating a misalignment amount of both sides of the conveyance medium based on positions where the marks are printed.

9 Claims, 12 Drawing Sheets

INSPECTION APPARATUS, IMAGE FORMING SYSTEM, MISALIGNMENT MEASUREMENT METHOD AND STORAGE MEDIUM

CROSS-REFERENCE TO RELATED APPLICATION

This patent application is based on and claims priority pursuant to 35 U.S.C. § 119(a) to Japanese Patent Application No. 2021-069030, filed on Apr. 15, 2021, in the Japan Patent Office, the entire disclosure of which is hereby incorporated by reference herein.

BACKGROUND

Technical Field

Embodiments of the present disclosure relate to an inspection apparatus, an image forming system, a misalignment measurement method and a storage medium.

Related Art

Various technologies that adjust a print position of images on both sides of a sheet have been developed, based on a result of reading the images on both sides of the sheet. The images are printed by an image forming apparatus including an image forming function on both sides of the sheet. In order to compare the positions of images on both sides of the sheet, a method of printing adjustment marks on both sides of the sheet is known. For example, a known technique prints adjustment marks on both sides of the sheet and measures an amount of misalignment between both sides of the sheet based on images obtained by reading the printed adjustment marks in order to detect misalignment between images on both sides of the sheet.

SUMMARY

According to an embodiment of the present disclosure, a novel inspection apparatus includes processing circuitry. The processing circuitry acquires read image data obtained by reading an image printed on both sides of a conveyance medium. The processing circuitry searches for marks printed on both sides of the conveyance medium in the read image data. The processing circuitry outputs information indicating a misalignment amount of both sides of the conveyance medium based on positions where the marks are printed.

According to an embodiment of the present disclosure an image forming system includes processing circuitry. The processing circuitry acquires read image data obtained by reading an image printed on both sides of a conveyance medium; searches for marks printed on both sides of the conveyance medium in the read image data; calculates a misalignment amount of both sides of the conveyance medium based on information of positions of the marks; and adjusts positions of both sides of a subsequent conveyance medium to be printed following the conveyance medium based on the calculated misalignment amount.

According to an embodiment of the present disclosure, there is provided a misalignment measurement method to be performed by a computer. The misalignment measurement method includes acquiring, searching, and outputting. The acquiring acquires read image data obtained by reading an image printed on both sides of a conveyance medium. The searching searches for marks printed on both sides of the conveyance medium in the read image data. The outputting outputs information indicating a misalignment amount of both sides of the conveyance medium based on positions where the marks are printed.

According to an embodiment of the present disclosure, there is provided a non-transitory, computer-readable storage medium storing computer-readable program code that causes a computer to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

First Embodiment

Descriptions are given of an image forming system according to a first embodiment of the present disclosure, with reference to the drawings.

Figure 1:
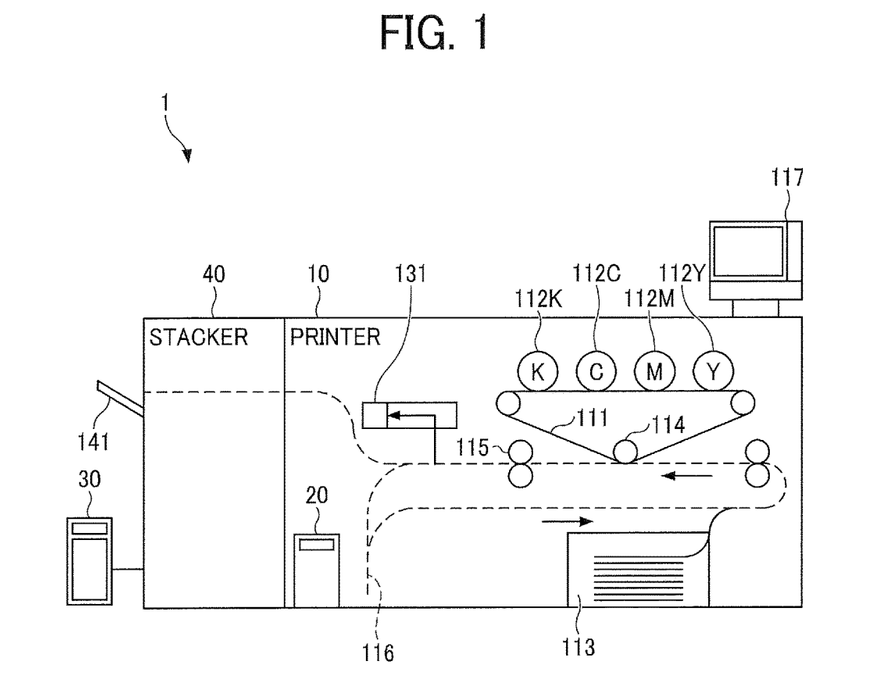
FIG. 1 is a diagram illustrating a system configuration of an image forming system according to embodiments of the present disclosure.

FIG. 1 is a diagram illustrating a system configuration of an image forming system according to embodiments of the present disclosure.

An image forming system 1 includes a printer 10, an inspection apparatus 20, a digital front end (DFE) 30, and a stacker 40. These devices are communicably connected to each other via communication line or communication network.

The printer 10 receives a print job including a user image data from an external device such as the DFE 30. Then, the printer 10 executes printing in response to receipt of an execution instruction based on the received print job data or a user operation on an operation panel 117 included in the printer 10.

The printer 10 includes photoconductor drums 112Y, 112M, 112C, and 112K disposed along a conveyance belt 111. The photoconductor drums 112Y, 112M, 112C, and 112K form yellow (Y), magenta (M), cyan (C), and black (K) toner images, respectively. The conveyance belt 111 is a moving unit of an endless loop.

Specifically, the printer 10 includes photoconductor drums 112Y, 112M, 112C, and 112K disposed in this order from upstream in the conveyance direction of the conveyance belt 111. The conveyance belt 111 is an intermediate transfer belt on which an intermediate transfer image to be transferred onto a sheet fed from the sheet feed tray 113 along the conveyance belt 111 is formed.

The printer 10 transfers respective images of black (K), cyan (C), magenta (M), and yellow (Y), which are developed with toner on each of surfaces of the photoconductor drums 112 for the respective colors, onto the conveyance belt 111 in a superimposing manner to form a full-color image. Then, the printer 10 transfers the full-color image formed on the conveyance belt 111 onto the sheet that has been conveyed by a transfer roller 114 along the sheet conveyance passage, at a position at which the full color image comes closest to the sheet conveyance passage indicated with broken lines in FIG. 1. Accordingly, the full color image is formed on the sheet.

The printer 10 further conveys the sheet having the image on the surface, so that the image is fixed to the sheet by a fixing roller pair 115. Then, the sheet is conveyed to a reading device 131 disposed downstream from the fixing roller pair 115 in the conveyance direction of the sheet. The reading device 131 reads the sheet conveyed via the fixing roller pair 115 and generates read image data.

In the case of single-side printing, the printer 10 directly ejects the sheet read by the reading device 131 to the stacker 40. In the case of duplex printing, the printer 10 reverses the sheet read by the reading device 131, in a sheet reverse passage 116, and then conveys the sheet to the conveyance position of the transfer roller 114 again.

Subsequently, the printer 10 transfers and fixes the toner image to the opposite side of the sheet printed on one side. Then, the reading device 131 reads the printed surface. Subsequently, the printer 10 ejects the duplex printed sheet to the stacker 40.

The stacker 40 stacks and stores the sheets ejected from the printer 10 on a sheet ejection tray 141.

The inspection apparatus 20 is a device that inspects printed sheets by the printer 10. Specifically, the inspection apparatus 20 searches for a mark in the read image read by the reading device 131, measures the misalignment between both sides of the sheet based on the searched mark, and transmits information indicating the measured misalignment to the printer 10. The printer 10 adjusts the print position based on the information indicating the misalignment.

The DFE 30 receives and manages the print job from a terminal operated by a user. The print job data includes image data and print job information indicating attributes of the job such as the number of copies to be printed, the number of pages to be printed, duplex or single-side printing, and the type of sheet. The DFE 30 adds the received print job data as a queue to a memory that stores the print job data. The DFE 30 extracts print job data from the queue in the order in which the print job data is added to the queue or in accordance with a priority set appropriately. Then, the DFE 30 transmits the print job data to the printer 10.

Figure 2:
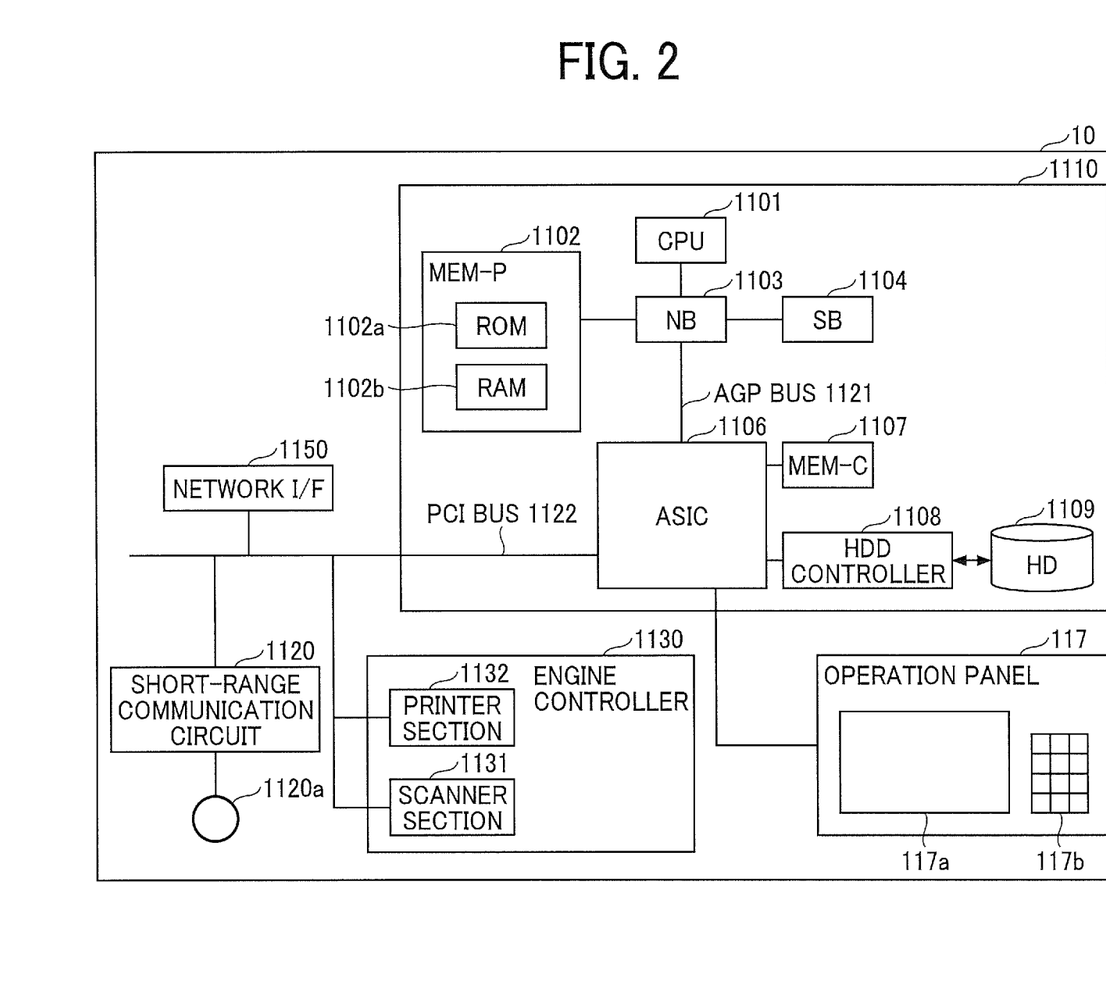
FIG. 2 is a diagram illustrating a hardware configuration of a printer of the image forming system of FIG. 1.

FIG. 2 is a diagram illustrating a hardware configuration of a printer of the image forming system of FIG. 1.

The printer 10 includes a controller 1110, a short-range communication circuit 1120, an engine controller 1130, the operation panel 117, and a network interface (I/F) 1150.

The controller 1110 includes a central processing unit (CPU) 1101 that is a main part of a computer, a system memory (MEM-P) 1102, a north bridge (NB) 1103, a south bridge (SB) 1104, an application specific integrated circuit (ASIC) 1106, a local memory (MEM-C) 1107 that is a memory unit, a hard disk drive (HDD) controller 1108, and a hard disk (HD) 1109 that is a memory.

The NB 1103 and the ASIC 1106 are connected by an accelerated graphics port (AGP) bus 1121.

The CPU 1101 is a control device that performs overall control of the printer 10. The NB 1103 is a bridge configured to connect the CPU 1101, the MEM-P 1102, the SB 1104, and the AGP bus 1121. The NB 1103 includes a memory controller that controls reading from and writing to the MEM-P 1102, a peripheral component interconnect (PCI) master, and an AGP target.

The MEM-P 1102 includes a read only memory (ROM) 1111*a* and a random access memory (RAM) 1111*b*. The ROM 1111*a* is a memory to store programs and data for implementing various functions of the controller 1110. The RAM 1111*b* is a memory configured to deploy programs, data or to render print data for memory printing. The program stored in the RAM 1111*b* may be provided as a file in an installable format or an executable format that the program is recorded in a computer-readable storage medium such as a compact disc-read only memory (CD-ROM), a compact disc-recordable (CD-R), or a digital versatile disc (DVD).

The SB 1104 is a bridge configured to connect the NB 1103 to PCI devices and peripheral devices. The ASIC 1106 is an integrated circuit (IC) for image processing having a hardware element for image processing and has a role of a bridge that connects the AGP bus 1121, the PCI bus 1122, the HDD controller 1108, and the MEM-C 1107 to each other.

The ASIC 1106 includes a PCI target, an AGP master, an arbiter (ARB) serving as a core of the ASIC 1106, a memory controller that controls the MEM-C 1107, a plurality of direct memory access controllers (DMAC) that rotates image data by hardware logic, and a PCI unit that transfers data between a scanner section 1131 and a printer section 1132 via the PCI bus 1122. A universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a memory that stores image data, font data used in printing, and forms. The HD 1109 controls reading or writing of data from or to the HD 1109 under the control of the CPU 1101.

The AGP bus 1121 is a bus interface for a graphics accelerator card that has been proposed to speed up graphics processing. The AGP bus 1121 is a bus that directly access the MEM-P 1102 at high throughput to speed up a graphics accelerator card.

The short-range communication circuit 1120 includes a short-range communication antenna 1120a. The short-range communication circuit 1120 is a communication circuit that communicates in compliance with the near field radio communication (NFC) or the Bluetooth®.

The engine controller 1130 includes the scanner section 1131 and the printer section 1132. The operation panel 117 includes a panel display 117a and a hard keys 117b. The panel display 117a is, e.g., a touch panel that displays current settings or a selection screen that receives the user input. The hard keys 117b includes, e.g., a numeric keypad and a start key. The numeric keypad receives setting values of image forming parameters such as an image density parameter. The start key receives an instruction to start copying.

The controller 1110 controls the overall printer 10 and controls, for example, drawing, communication, and input from the operation panel 117. The scanner section 1131 reads the image formed on the conveyance medium such as a sheet and generates image data. The printer section 1132 includes a transfer device that transfers the image using a color material such as a toner image onto the conveyance medium such as the sheet, a fixing device that fixes the image, a heating device, a drying device, and performs image formation on the sheet. Further, the scanner section 1131 or the printer section 1132 executes image processing such as error diffusion and gamma conversion.

Note that the sheet is an example of a conveyance medium. The conveyance medium may be any medium other than paper, such as a film sheet or a plastic sheet, as long as the conveyance medium is stacked in a sheet feeding tray provided for the printer 11, to be conveyed and output according to an output instruction of the slip sheet.

The network I/F 1150 is an interface that performs communication of data through the communication network. The short-range communication circuit 1120 and the network I/F 1150 are electrically connected to the ASIC 1106 via the PCI bus 1122.

Although the example of the printer 10 illustrated in FIG. 2 includes an electrophotographic image forming mechanism, the printer 10 may include another image forming mechanism such as an inkjet image forming mechanism.

Figure 3:
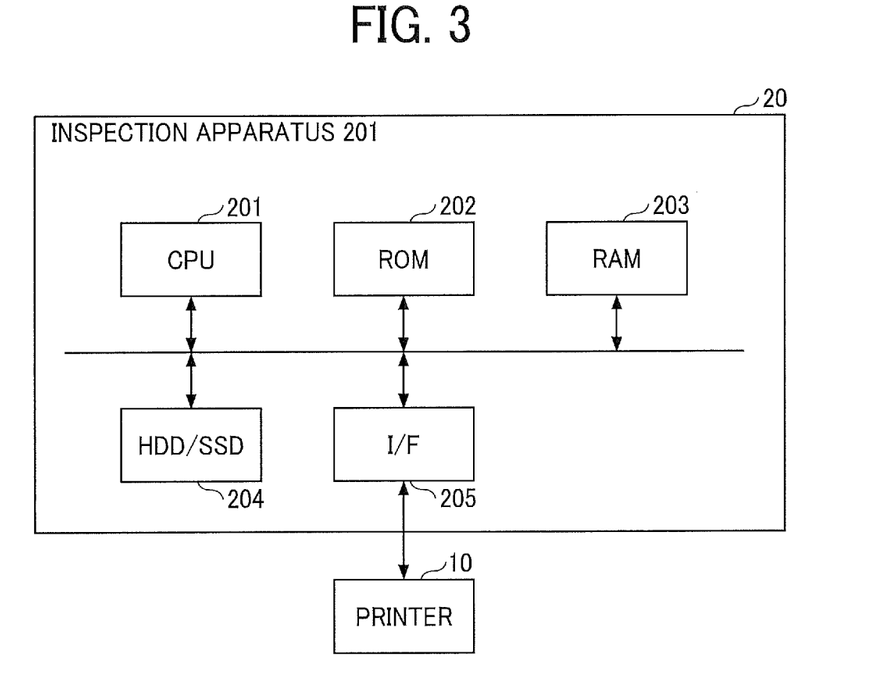
FIG. 3 is a diagram illustrating a hardware configuration of an inspection apparatus of the image forming system of FIG. 1.

FIG. 3 is a diagram illustrating a hardware configuration of an inspection apparatus of the image forming system of FIG. 1.

The inspection apparatus 20 is configured by a computer and includes a central processing unit (CPU) 201, a read only memory (ROM) 202, a random access memory (RAM) 203, a hard disk drive/solid state drive 204 (hereinafter, the HDD/SSD 204), and an interface (I/F) 205.

The CPU 210 reads programs stored in the ROM 202 or the HDD/SSD 204 and stores the programs in the RAM 203. Then, the CPU 201 executes various processes in accordance with the program stored in the RAM 203. The processes are described below.

The ROM 202 is a non-volatility auxiliary memory device. The ROM 202 stores programs such as a basic input/output system (BIOS) that is programed basic operations of the inspection apparatus 20.

The RAM 203 is a volatile main memory device. The RAM 203 is used as a working area of the CPU 201.

The HDD/SSD 204 is a large capacity non-volatility auxiliary memory device. The HDD/SSD 204 stores received image data, programs for various processes, and setting information. The processes are described below.

The I/F 205 is, for example, a local area network (LAN) card, and is a relay unit for communicating with other devices such as the printer 10.

Figure 4:
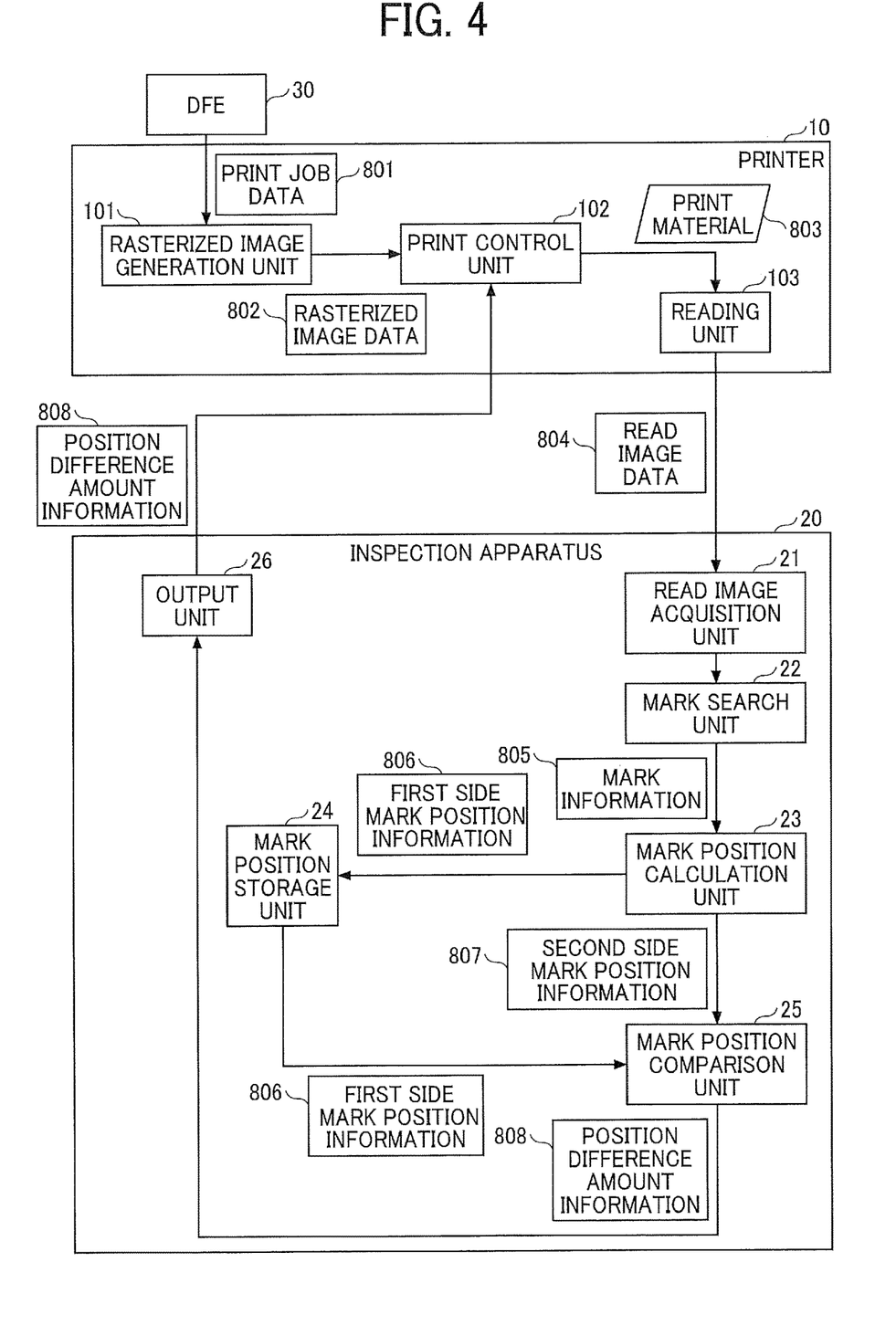
FIG. 4 is a diagram illustrating a functional configuration of the printer and the inspection apparatus according to a first embodiment of the present disclosure.

FIG. 4 is a diagram illustrating a functional configuration of the printer and the inspection apparatus according to the first embodiment of the present disclosure.

The printer 10 includes a rasterized image generation unit 101, a print control unit 102, and a reading unit 103.

The rasterized image generation unit 101 converts the user image data included in print job data 801 received from the DFE 30 into a CMYK format suitable for the printer 10 to generate rasterized image data 802. The user image data is, for example, in a format of page description language (PDL) such as PostScript® or tagged image file format (TIFF) but is not limited to these formats.

The print control unit 102 performs control to print an image on a conveyance medium based on the rasterized image data 802.

The reading unit 103 reads the conveyance medium (print material 803) on which the image is printed, generates read image data 804, and then transmits the read image data 804 to the inspection apparatus 20. The reading unit 103 is achieved by the printer 10 controlling the reading device 131.

The inspection apparatus 20 includes a read image acquisition unit 21, a mark search unit 22, a mark position calculation unit 23, a mark position storage unit 24, a mark position comparison unit 25, and an output unit 26. Each of the units of the inspection apparatus 20 is achieved by the CPU 201 reading programs stored in the ROM 202 or the HDD/SSD 204 included in the inspection apparatus 20 and executing processing defined in the programs.

The read image acquisition unit 21 receives the read image data 804 from the printer 10. This receipt of the read image data 804 by the read image acquisition unit 21 is achieved by the CPU 201 controlling the I/F 205.

The mark search unit 22 is configured to search for marks printed on both sides of a sheet from the read image data 804. The mark to be searched is, for example, a trimming mark or a corner mark included in the user image data. A detailed description of a mark searching method is given below. When the mark is found, the mark search unit 22 generates mark information 805 indicating information of each mark printed on both sides of the sheet.

The mark position calculation unit 23 calculates the position of each mark based on the mark information 805. Specifically, the mark position calculation unit 23 calculates the position of the mark on one side (first side) of the sheet based on the read image obtained by reading the first side of the sheet, generates first side mark position information 806 indicating the position of the mark on the first side of the sheet, and stores the first side mark position information 806 in the mark position storage unit 24. In other words, the mark position calculation unit 23 is configured to store information of the first side mark position as a result into the mark position storage unit 24. Next, when the read image acquisition unit 21 acquires the read image data obtained by reading the opposite side (second side) of the sheet, the mark position calculation unit 23 calculates the position of the mark on the second side (the back side of the first side) of the sheet based on the read image data obtained by the read image acquisition unit 21, and then generates second side mark position information 807 indicating the position of the mark on the second side of the sheet.

The mark position comparison unit 25 compares the positions of the marks on both sides (i.e., the first side and the second side) of the sheet based on the first side mark position information 806 stored in the mark position storage unit 24 and the second side mark position information 807 generated by the mark position calculation unit 23. Then, the mark position comparison unit 25 calculates a misalignment amount indicating the amount of difference between the printing position of the mark on the first side and the printing position of the mark on the second side based on the comparison result. Then, the mark position comparison unit 25 generates misalignment amount information 808 indicating the calculated misalignment amount.

The output unit 26 is configured to output information to the printer 10. Specifically, the output unit 26 transmits the generated misalignment amount information 808 to the printer 10. The print control unit 102 of the printer 10 adjusts the position of the subsequent sheet to be printed following the sheet based on the misalignment amount information 808. In other words, the print control unit 102 of the printer 10 adjusts the position of the subsequent conveyance medium to be printed.

Next, descriptions are given of operations of the inspection apparatus 20, with reference to the drawings. When the printer 10 performs printing on both sides of the sheet based on the print job data 801, the inspection apparatus 20 executes a misalignment amount transmitting process. When the print job data 801 is not for duplex printing, the inspection apparatus 20 does not execute the misalignment amount transmitting process.

Figure 5:
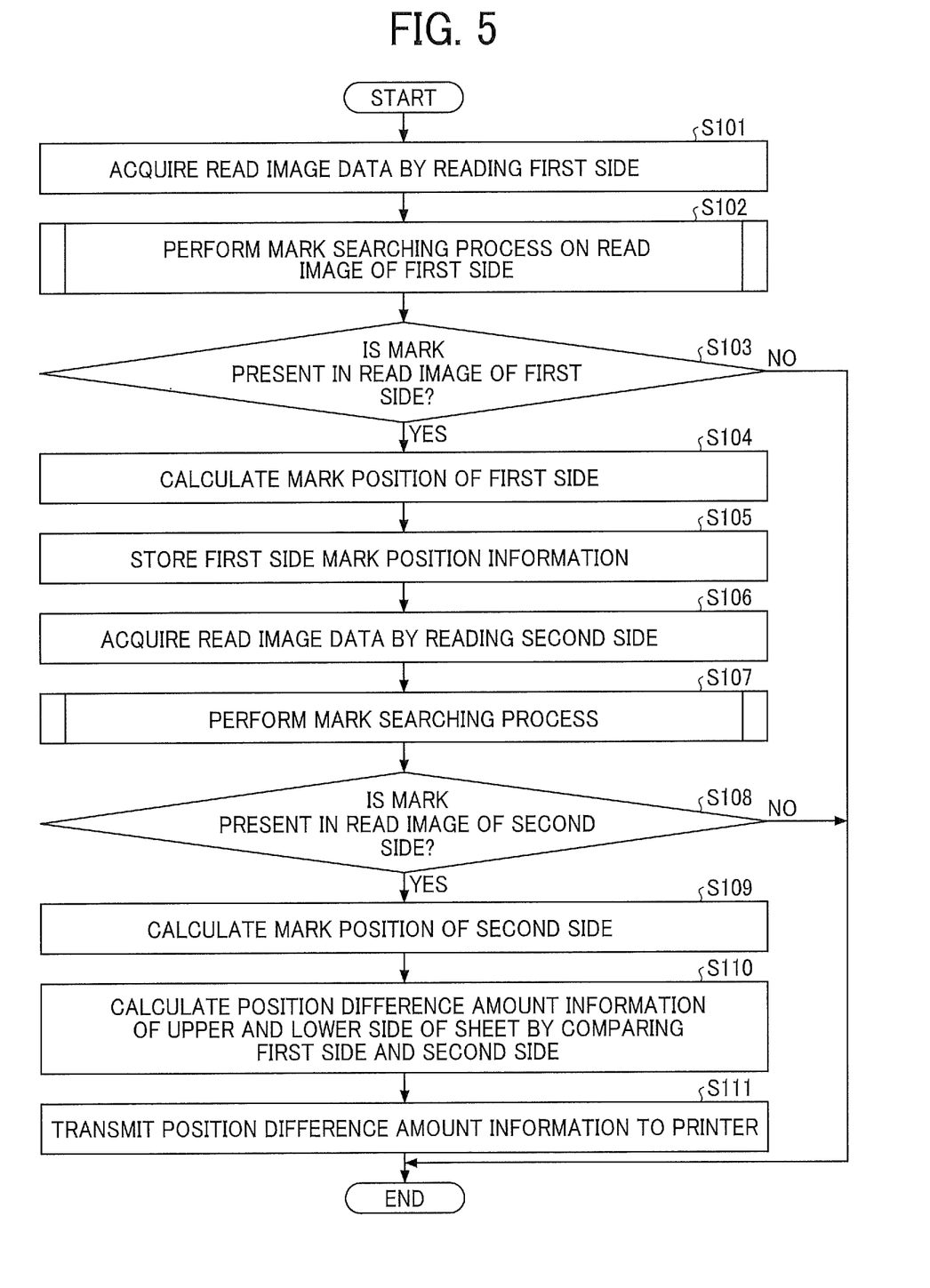
FIG. 5 is a flowchart of an example of a misalignment amount transmitting process according the first embodiment of the present disclosure.

FIG. 5 is a flowchart of an example of a misalignment amount transmitting process according the first embodiment of the present disclosure.

The read image acquisition unit 21 acquires read image data obtained by reading the first side of the sheet (step S101). The mark search unit 22 performs a mark searching process on the read image of the first side of the sheet (step S102). A detailed description of the mark searching process is given below. The mark search unit 22 determines whether a mark is present or not in the read image of the first side of the sheet based on a result of the mark searching process (step S103).

When the mark search unit 22 determines that the mark is not present in the read image of the first side of the sheet (NO in step S103), the mark search unit 22 ends the misalignment amount transmitting process.

When the mark search unit 22 determines that the mark is present in the read image of the first side of the sheet (YES in step S103), the mark position calculation unit 23 calculates the mark position of the first side of the sheet based on the mark information 805 generated by the mark search unit 22 (step S104). Then, the mark position storage unit 24 stores the first side mark position information 806 generated by the mark position calculation unit 23 (step S105).

Subsequently, the read image acquisition unit 21 acquires read image data obtained by reading the second side of the sheet (step S106). The mark search unit 22 performs the mark searching process on the read image of the second side of the sheet (step S107). A detailed description of the mark searching process is given below. The mark search unit 22 determines whether a mark is present in the read image of the second side of the sheet based on a result of the mark searching process (step S108).

When the mark search unit 22 determines that the mark is not present in the read image of the second side of the sheet (NO in step S108), the mark search unit 22 ends the misalignment amount transmitting process.

When the mark search unit 22 determines that the mark is present in the read image of the second side of the sheet (YES in step S108), the mark position calculation unit 23 calculates the mark position of the second side of the sheet based on the mark information 805 generated by the mark search unit 22 (step S109).

The mark position comparison unit 25 compares the respective mark positions of the first side and the second side of the sheets based on the first side mark position information 806 stored in the mark position storage unit 24 and the second side mark position information 807 generated by the mark position calculation unit 23, respectively, and calculates the misalignment amount of both sides of the sheet (step S110). In other words, the mark position comparison unit 25 is configured to calculate the misalignment amount of both sides of the conveyance medium based on information of positions of printed marks.

For example, the mark position comparison unit 25 sets an average value of differences between four mark positions on each side of the sheet in each of the X coordinate and the Y coordinate as the misalignment amount.

For example, it is assumed that X-Y coordinates of the four mark positions on the first side of the sheet are $(X1a, Y1a)$, $(X1b, Y1b)$, $(X1c, Y1c)$, and $(X1d, Y1d)$ and X-Y coordinates of the four mark positions on the second side of the sheet are $(X2a, Y2a)$, $(X2b, Y2b)$, $(X2c, Y2c)$, and $(X2d, Y2d)$. The misalignment amount $(Xt, Yt)$ is calculated by the following equations 1 and 2.

$$Xt=((X1a-X2a)+(X1b-X2b)+(X1c-X2c)+(X1d-X2d))/4 \qquad \text{Equation 1}$$

$$Yt=((Y1a-Y2a)+(Y1b-Y2b)+(Y1c-Y2c)+(Y1d-Y2d))/4 \qquad \text{Equation 2}$$

The output unit 26 transmits the misalignment amount information 808 generated by the mark position comparison unit 25 to the printer 10 (step S111). Note that the output unit 26 may display a screen indicating the misalignment amount information 808 on the operation panel 117 or another display. Alternatively, the output unit 26 may transmit the misalignment amount information 808 to another device.

Figure 6:
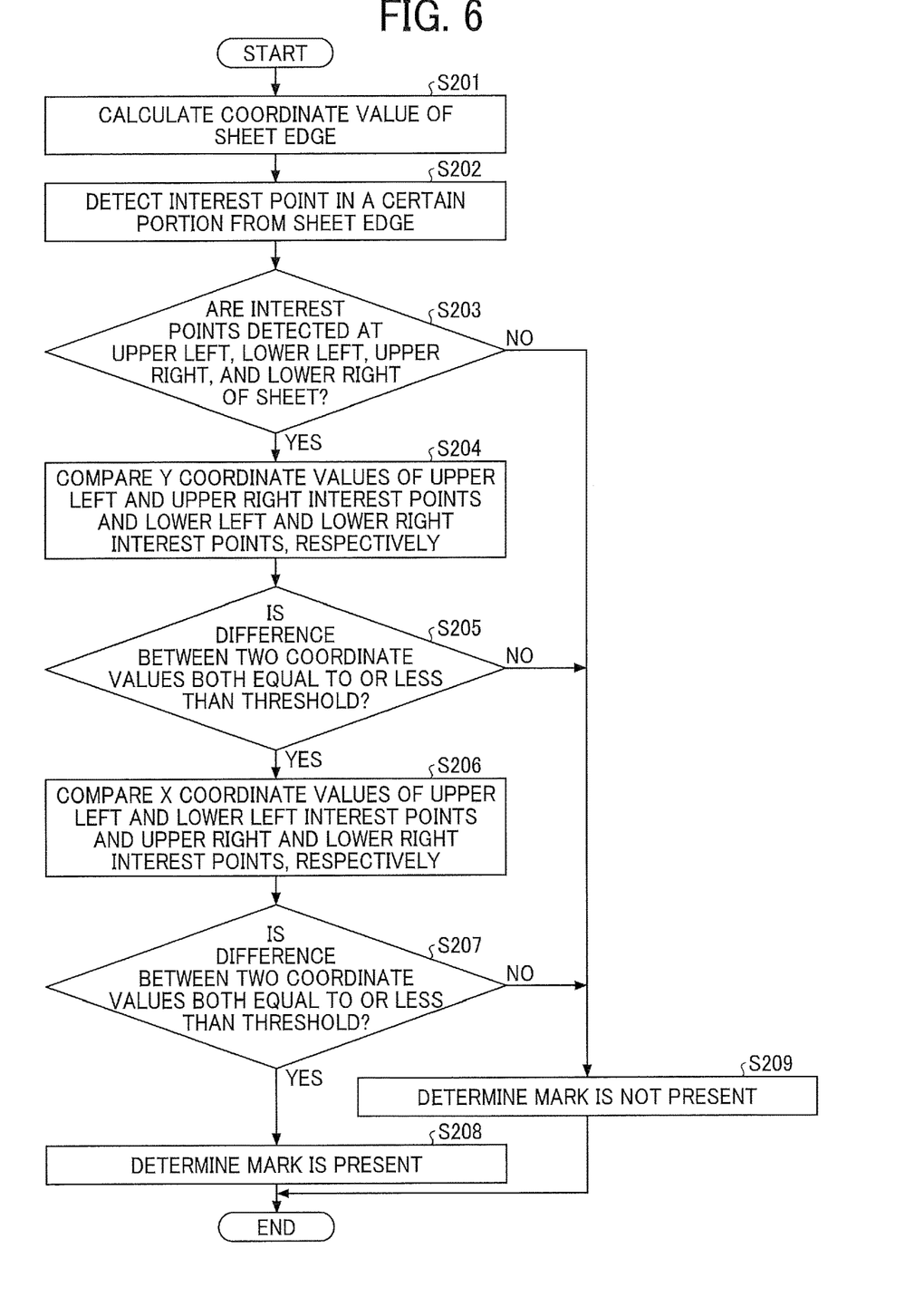
FIG. 6 is a flowchart of an example of a mark searching process according the first embodiment of the present disclosure.

FIG. 5 is a flowchart of an example of a mark searching process according the first embodiment of the present disclosure.

In step S102 or step S107 of the misalignment amount transmitting process described above, the mark search unit 22 executes the mark searching process.

The mark search unit 22 calculates the coordinate value of the sheet edge (step S201). The coordinate value is, for example, a value in a coordinate system in which an axis along the conveyance direction of the sheet is a Y axis and an axis orthogonal to the Y axis is an X axis. Specifically, the mark search unit 22 calculates coordinate values of the upper left, lower left, upper right, and lower right edges of the sheet from the read image data 804. For example, the mark search unit 22 sets a boundary position where a point that changes from the region outside the sheet toward the center of the sheet is present, and then determines the coordinate value of the edge portion of each sheet based on the boundary position. However, the calculation method is not limited the method described above.

Next, the mark search unit 22 detects an interest point in a given area from the sheet edge (step S202). The given area is set in advance. A detailed description of a searching interest point method is given below.

Next, the mark search unit 22 determines whether the interest points are detected at the upper left, lower left, upper right, and lower right of the sheet (step S203). The mark search unit 22 performs corner detection on the given area from the upper left, lower left, upper right, and lower right edges of the sheet, and detects interest points. A detailed description of the corner detection is given below.

When the mark search unit 22 determines that the interest points are not detected at the upper left, lower left, upper right, and lower right of the sheet (NO in step S203), the mark search unit 22 determines that the mark does not exist (step S209), and then the mark searching process ends.

When the mark search unit 22 determines that the interest points are detected at the upper left, lower left, upper right, and lower right of the sheet (YES in step S203), the mark search unit 22 compares the Y coordinate values of the interest points at the upper left and upper right, and the interest points at lower left and lower right (step S204). The mark search unit 22 determines whether the difference between the two compared coordinate values is less than or equal to a threshold (step S205).

For example, it is assumed that the coordinate value of the upper left interest point is (X_upper_left, Y_upper_left), the coordinate value of the lower left interest point is (X_lower_left, Y_lower_left), the coordinate value of the upper right interest point is (X_upper_right, Y_upper_right), and the coordinate value of the lower right interest point is (X_lower_right, Y_lower_right). The mark search unit 22 determines whether the following equations 3 and 4 are satisfied (step S205).

$$|Y\_upper\_left - Y\_upper\_right| \leq th\_y \quad \text{Equation 3}$$

$$|Y\_lower\_left - Y\_lower\_right| \leq th\_y \quad \text{Equation 4}$$

Note that the "th y" is a threshold in the Y coordinate value.

When the mark search unit 22 determines that any one of the differences between the compared two coordinate values is not less than or equal to the threshold (NO in step S205), the mark search unit 22 determines that mark is not present (step S209), and then the mark searching process ends.

Next, when the mark search unit 22 determines that the difference between the compared two coordinate values is less than or equal to the threshold (YES in step S205), the mark search unit 22 compares the X coordinate values of the interest points at the upper left and lower left, and the interest points at upper right and lower right (step S206). The mark search unit 22 determines whether the difference between the two compared coordinate values is less than or equal to a threshold (step S207).

Specifically, the mark search unit 22 determines whether the following equations 5 and 6 are satisfied.

$$|X\_upper\_left - X\_lower\_left| \leq th\_x \quad \text{Equation 5}$$

$$|X\_upper\_right - X\_lowerright| \leq th\_x \quad \text{Equation 6}$$

Note that the "thx" is a threshold in the X coordinate value.

When the mark search unit 22 determines that any one of the differences between the compared two coordinate values is not less than or equal to the threshold (NO in step S207), the mark search unit 22 determines that mark is not present (step S209), and then the mark searching process ends.

Next, when the mark search unit 22 determines that the difference between the compared two coordinate values is less than or equal to the threshold (YES in step S207), the mark search unit 22 determines that a mark is present (step S208).

Figure 7:
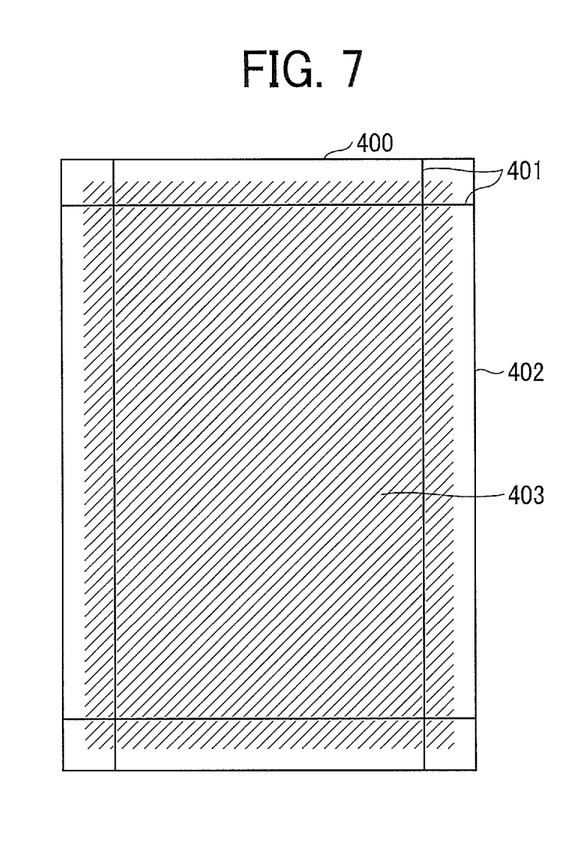
FIG. 7 is a first diagram illustrating an example of a mark according the first embodiment of the present disclosure.

FIG. 7 is a first diagram illustrating an example of a mark according the first embodiment of the present disclosure.

In FIG. 7, a user image 403 and trim marks 401 are printed on a sheet 400. The trim marks 401 are used for cutting or alignment. As illustrated in FIG. 7, the trim marks 401 have corners at four corner positions near the edge 402 of the sheet 400. A corner is an area where a large change in pixel value is observed in each direction.

Figure 8:
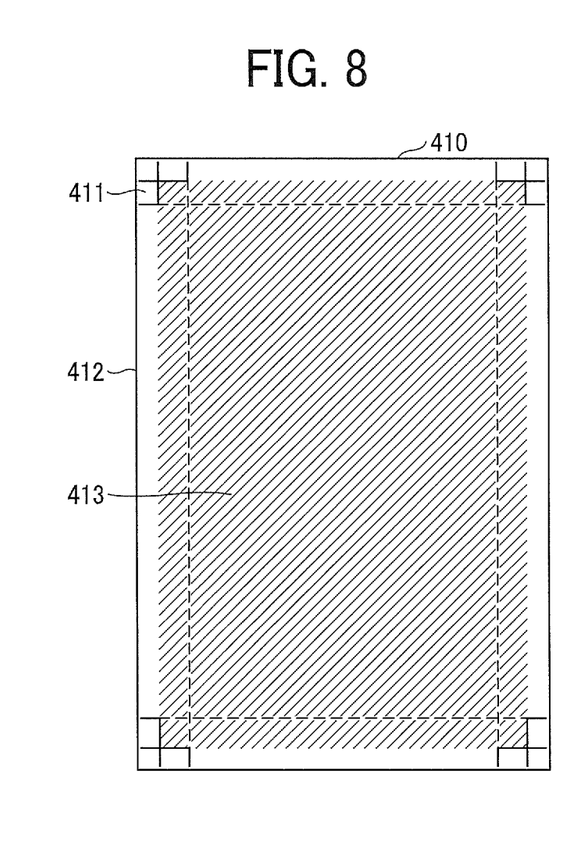
FIG. 8 is a second diagram illustrating an example of the mark according the first embodiment of the present disclosure.

FIG. 8 is a second diagram illustrating an example of the mark according the first embodiment of the present disclosure.

In FIG. 8, a user image 413 and mainly corner marks 411 are printed on a sheet 410. The corner marks 411 are used for cutting or alignment in the same manner as the trim marks 401. As illustrated in FIG. 8, like the trim marks 401, the corner marks 411 have corners at four corner positions near an edge 412 of the sheet 410.

Figure 9:
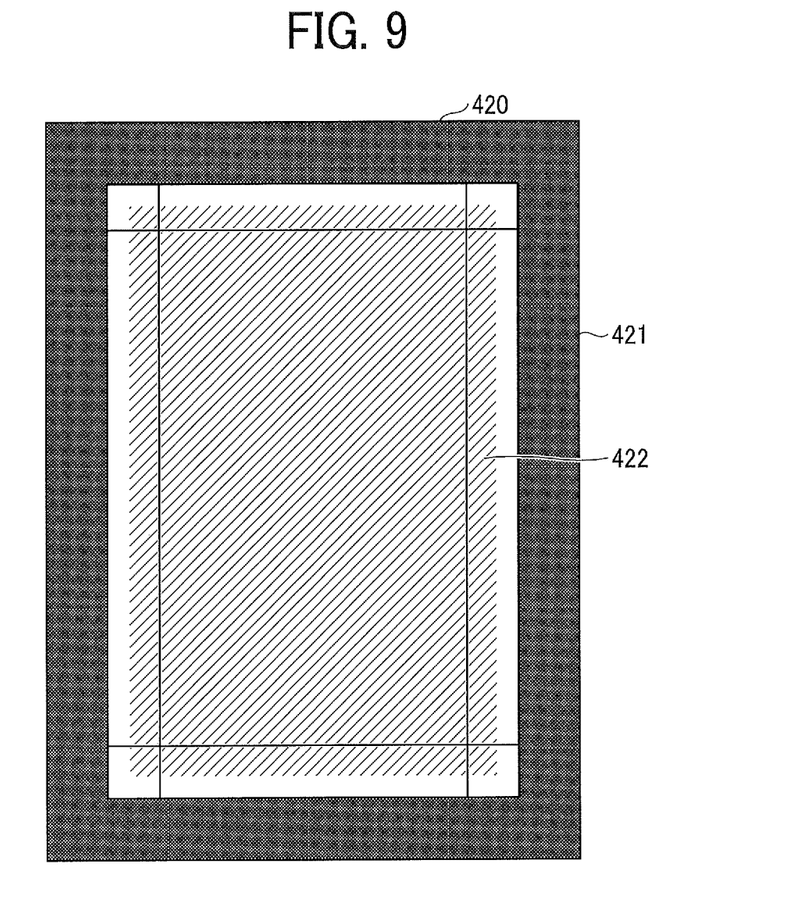
FIG. 9 is diagram illustrating an example of a read image according the first embodiment of the present disclosure.

FIG. 9 is diagram illustrating an example of the read image according the first embodiment of the present disclosure.

A read image 420 includes an area 421 outside the sheet and an image area 422 obtained by reading the sheet. In step S201 of the mark searching process, the mark search unit 22 calculates the coordinate values of the sheet edge by determining the boundary between the area 421 outside the sheet and the image area 422 through image processing.

Figure 10:
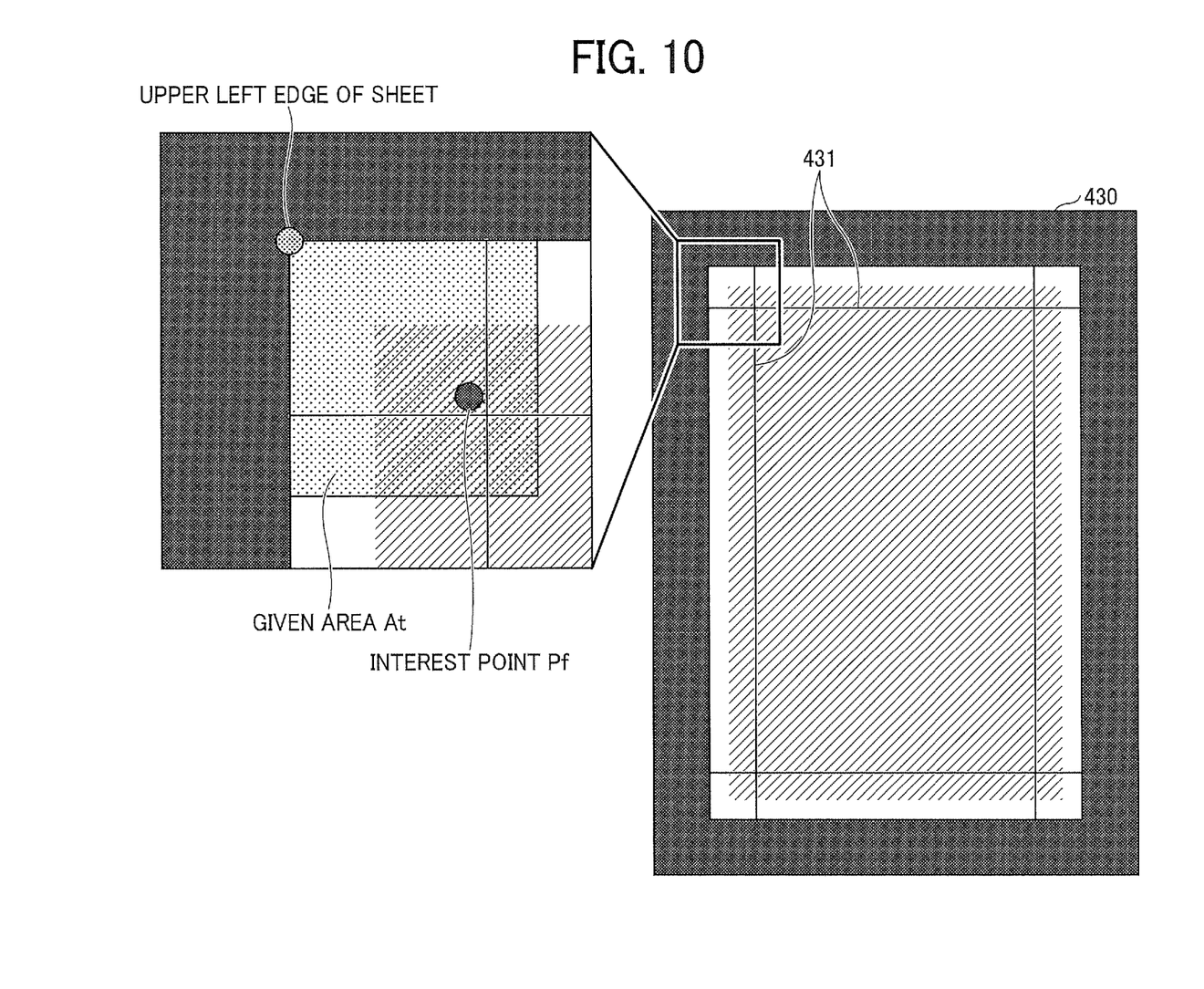
FIG. 10 is a diagram illustrating a mark searching method according the first embodiment of the present disclosure.

FIG. 10 is a diagram illustrating a method of searching for the mark, according the first embodiment of the present disclosure.

In step S202 of the mark searching process, the mark search unit 22 detects an interest point in a given area from the sheet edge in the read image 430. Specifically, for example, the mark search unit 22 performs corner detection and detects an interest point (interest point Pf) in an area (given area At) having a constant length from the upper left edge of the sheet. The mark search unit 22 employs, for example, a Harris operator as a corner detection method (algorithm).

Since the mark such as a trimming mark 431 is generally printed on the edge portion of the sheet, the mark search unit 22 selects the interest points closest to the upper left, lower left, upper right, and lower right edge portions of the sheet from the interest points detected by the corner detection.

Figure 11:
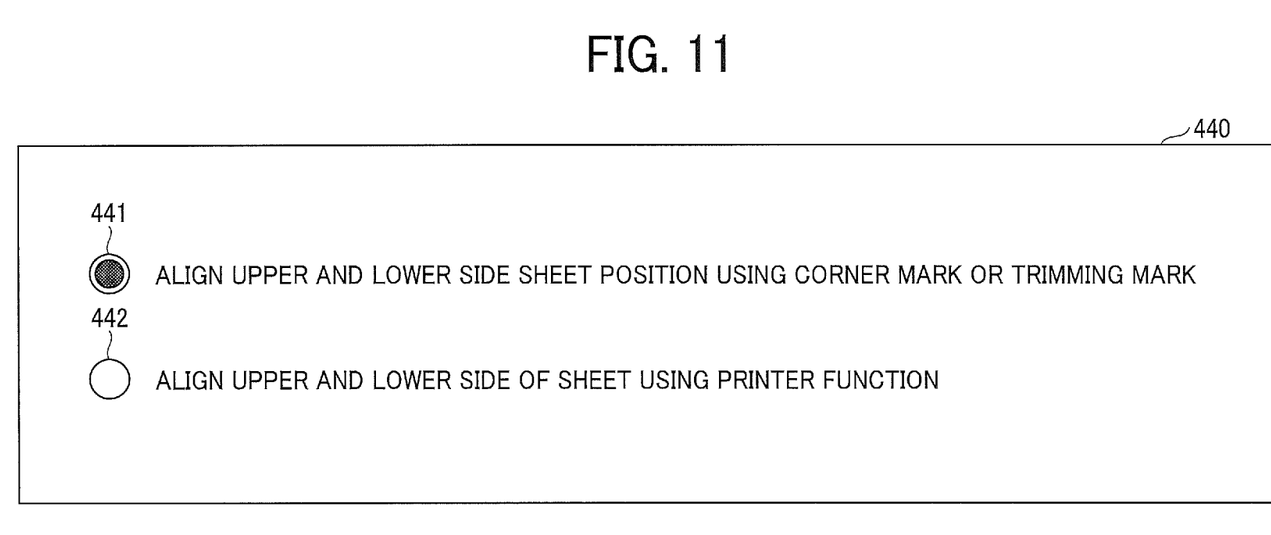
FIG. 11 is a diagram illustrating an example of an alignment method setting screen according the first embodiment of the present disclosure.

FIG. 11 is a diagram illustrating an example of an alignment method setting screen according the first embodiment of the present disclosure.

An alignment method setting screen 440 is a screen that is displayed on the operation panel 117 to receive an operation of a user before starting printing. The alignment method setting screen 440 includes a selection button 441 and a selection button 442. The selection button 441 enables a function of performing double-sided alignment using a corner mark, a trim mark included in the user image. The selection button 442 enables a function of performing alignment by the printer 10 printing a mark such as a corner mark, a trim mark.

The misalignment amount transmitting process illustrated in FIG. 5 is executed when the selection button 441 is selected. When the selection button 442 is selected, the printer 10 prints a mark and performs alignment using the printed mark.

The image faulting system 1 receives a setting for enabling a function using marks included in a user image, via the alignment method setting screen 440. When the function is set to be enabled, the image forming system 1 searches for the marks. Thus, the user may select a function to be used in accordance with the user image.

According to the image forming system 1 of the present embodiment, marks printed on both sides of a sheet are searched for from read image data. Information indicating the misalignment amount of both sides of the sheet is output based on the positions where the searched marks are printed. As a result, the misalignment amount of both sides of the sheet is measured by using the mark included in the image data.

Further, the image forming system 1 detects interest points included in a given area at four corners of each side of the sheet. Then the image forming system 1 searches for the interest points as mark in response to detection of each of interest points at the four corners. Accordingly, when the user image includes an image representing a shape such as a table, an error of recognizing the image as a mark is prevented.

Further, the image forming system 1 determines whether a mark is present or not based on horizontal or vertical position of each interest point detected at the four corners. Therefore, the features of the corner mark or the trimming mark are captured, and these marks are detected more accurately.

Further, the image forming system 1 calculates the misalignment amount of both sides of the sheet based on the information indicating the mark position of the first side stored in the mark position storage unit 24 and the information indicating the mark position of the second side searched by the mark search unit 22. As a result, the positions of the marks in the read image are compared in real time and the misalignment amount is quickly calculated.

Second Embodiment

Descriptions are given of an image forming system 1 according to a second embodiment of the present disclosure, with reference to the drawings. The configuration of the image forming system 1 according to the second embodiment is basically similar to the configuration of the image forming system 1 according to the first embodiment. Different from the first embodiment, the configuration of the image forming system 1 according to the second embodiment that the image forming system 1 receives setting of a mark search area. Thus, in the following description of the second embodiment, differences from the first embodiment are described. The components of the second embodiment having the same functional configurations as the components of the first embodiment are denoted by the same reference numerals used in the description of the first embodiment, and descriptions of the components similar to the first embodiment are omitted in the second embodiment.

Figure 12:
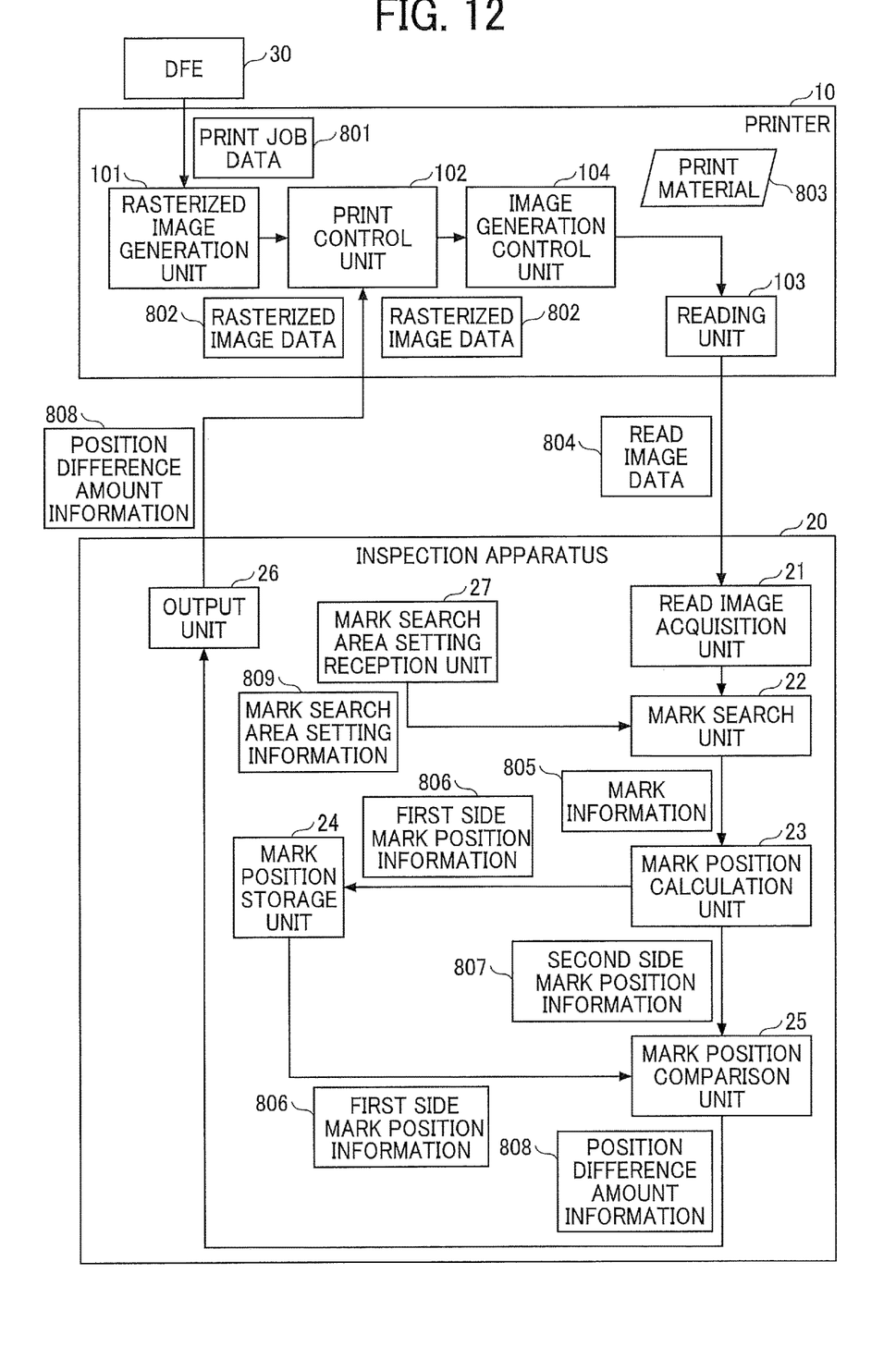
FIG. 12 is a diagram illustrating functional configuration of the printer and the inspection apparatus according to a second embodiment of the present disclosure.

FIG. 12 is a diagram illustrating functional configuration of the printer and the inspection apparatus according to a second embodiment of the present disclosure.

The inspection apparatus 20 according to the present embodiment further includes a mark search area setting reception unit 27 in addition to the inspection apparatus 20 according to the first embodiment.

The mark search area setting reception unit 27 receives an operation from a user and receives a setting of a given area (the given area At illustrated in FIG. 10) in which a mark is searched for.

Figure 13:
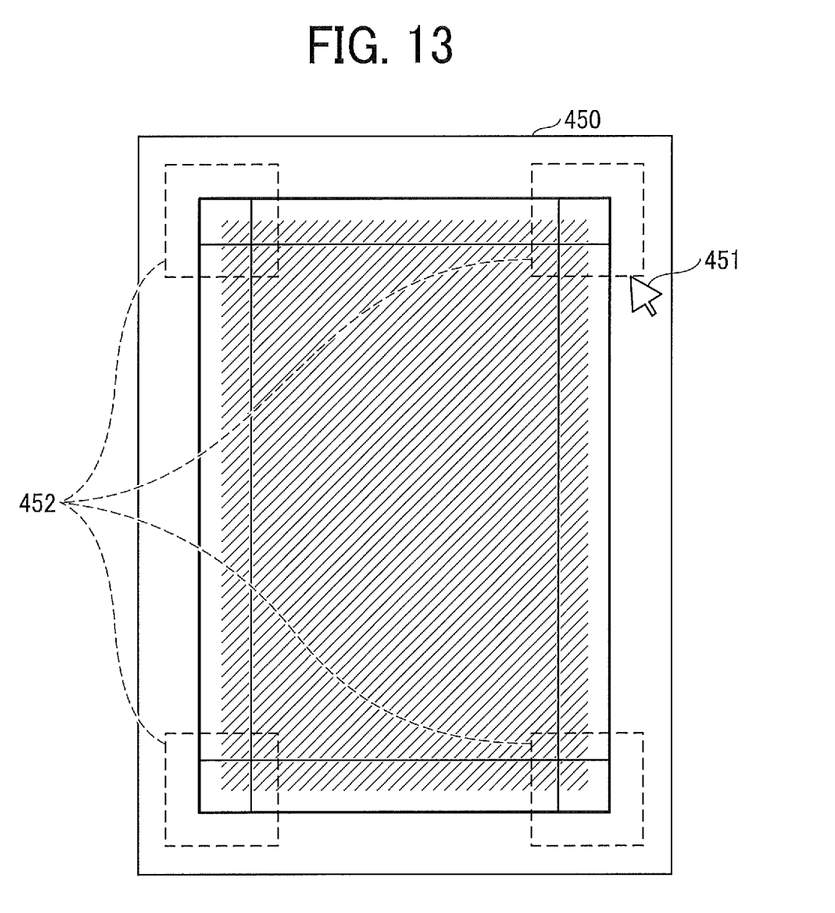
FIG. 13 is a diagram illustrating a mark search area setting screen according to the second embodiment.

FIG. 13 is a diagram illustrating a mark search area setting screen according to the second embodiment.

The user operates a cursor 451 to designate mark search areas 452 in the mark search area setting screen 450. By so doing, the mark search area setting screen 450 receives the setting of the given area At. The mark search area setting screen 450 may be displayed together with the read image data to facilitate the user's operation.

Further, the mark search area setting reception unit 27 receives the setting for each sheet or each print job. When the mark search area setting reception unit 27 receives the mark search area for each print job, the mark search area setting reception unit 27 may display the read image data obtained by reading the first sheet included in the print job and applies the set given area At to each sheet of the print job.

Although the typical shape of a mark set by a user on a print image is fixed, the position of the mark may vary depending on the size of a sheet to be printed. Therefore, the user specifies an area corresponding to the position of the mark in the read image so that the mark is detected more accurately.

In each of the above-described embodiments, the DFE 30, the inspection apparatus 20 and the printer 10 are configured to share the above-described processing steps in various combinations. Further, the elements of the DFE 30, the inspection apparatus 20 and the printer 10 may be integrated into one apparatus or may be separately disposed in a plurality of different apparatuses.

In an embodiment, the DFE 30 or the inspection apparatus 20 may be configured as an information processing system including a plurality of computing devices such as a server cluster. The plurality of computing devices is configured to communicate with one another via any type of communication link, including a network or shared memory to implement the processing described in the present invention.

The elements of the above-described embodiments can be modified without departing from the gist of the present invention, and can be appropriately determined according to the application form.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An inspection apparatus comprising:
processing circuitry configured to:
acquire read image data obtained by reading an image printed on both sides of a conveyance medium;
detect interest points included in given areas at four corners of each side of the conveyance medium, each of the given areas having a predetermined length from an edge of the conveyance medium;
determine the interest points as marks printed on both sides of the conveyance medium in the read image data in response to detection of the interest points in the given areas at all of the four corners of each side of the conveyance medium; and
output information indicating a misalignment amount of both sides of the conveyance medium based on positions where the marks are printed.

2. The inspection apparatus according to claim 1, wherein the processing circuitry is configured to determine whether the marks are present based on a horizontal or vertical position of each of the interest points detected in the given areas at all of the four corners of each side of the conveyance medium.

3. The inspection apparatus according to claim 1, wherein the processing circuitry is configured to receive setting of the given areas.

4. The inspection apparatus according to claim 1, further comprising:
a memory configured to store first-side mark-position information indicating positions of marks on a first side of the conveyance medium; and
processing circuitry configured to calculate the misalignment amount of both sides of the conveyance medium based on the first-side mark-position information stored in the memory and second-side mark-position information indicating positions of marks on a second side of the conveyance medium searched by the processing circuitry.

5. The inspection apparatus according to claim 1, wherein the processing circuitry is configured to:
receive a setting for enabling a function using marks included in an image to adjust positions of both sides of the conveyance medium; and
search for the marks in response to the setting for enabling the function.

6. An image forming system comprising:
processing circuitry configured to:
acquire read image data obtained by reading an image printed on both sides of a conveyance medium;
detect interest points included in given areas at four corners of each side of the conveyance medium, each of the given areas having a predetermined length from an edge of the conveyance medium;
determine the interest points as marks printed on both sides of the conveyance medium in the read image data in response to detection of the interest points in the given areas at all of the four corners of each side of the conveyance medium;
calculate a misalignment amount of both sides of the conveyance medium based on information of positions of the marks; and
adjust positions of both sides of a subsequent conveyance medium to be printed following the conveyance medium based on the calculated misalignment amount.

7. A misalignment measurement method to be performed by a computer, the misalignment measurement method comprising:
acquiring read image data obtained by reading an image printed on both sides of a conveyance medium;
detecting interest points included in given areas at four corners of each side of the conveyance medium, each of the given areas having a predetermined length from an edge of the conveyance medium;
determining the interest points as marks printed on both sides of the conveyance medium in the read image data in response to detection of the interest points in the given areas at all of the four corners of each side of the conveyance medium; and
outputting information indicating a misalignment amount of both sides of the conveyance medium based on positions where the marks are printed.

8. A non-transitory, computer-readable storage medium storing computer-readable program code that causes a computer to perform the method of claim 7.

9. The inspection apparatus according to claim 1, wherein the edge of the conveyance medium is identified by determining a boundary between a printed image area and an outside area that is outside the conveyance medium through image processing.

* * * * *